(12) United States Patent
Liu et al.

(10) Patent No.: US 8,217,632 B2
(45) Date of Patent: Jul. 10, 2012

(54) SYNCHRONOUS DRIVER CIRCUIT AND INTEGRATED CIRCUIT FOR USE THEREIN

(75) Inventors: Jing-Meng Liu, Chupei (TW);
Chia-Wei Liao, San Jose, CA (US);
Heng Yun, Palo Alto, CA (US)

(73) Assignee: Richtek Technology Corporation, Hsin-Chu (TW)

( * ) Notice: Subject to any disclaimer, the term of this patent is extended or adjusted under 35 U.S.C. 154(b) by 387 days.

(21) Appl. No.: 12/658,560

(22) Filed: Feb. 5, 2010

(65) Prior Publication Data

US 2011/0012570 A1 Jan. 20, 2011

(30) Foreign Application Priority Data

Jul. 14, 2009 (TW) .............................. 98123819 A

(51) Int. Cl.
*G05F 1/613* (2006.01)
*G05F 1/44* (2006.01)
(52) U.S. Cl. ........................................ 323/222; 323/282
(58) Field of Classification Search .................. 323/222, 323/224, 282, 283
See application file for complete search history.

(56) References Cited

U.S. PATENT DOCUMENTS

| 5,739,639 | A | 4/1998 | Johnson | |
|---|---|---|---|---|
| 6,603,291 | B2* | 8/2003 | Wheeler et al. | 323/224 |
| 6,788,033 | B2 | 9/2004 | Vinciarelli | |
| 7,157,888 | B2* | 1/2007 | Chen et al. | 323/224 |
| 7,443,147 | B2* | 10/2008 | Kasai et al. | 323/259 |
| 7,843,177 | B2* | 11/2010 | Ho et al. | 323/222 |
| 7,900,361 | B2* | 3/2011 | Adest et al. | 30/80 |
| 7,977,928 | B2* | 7/2011 | Fahrenbruch et al. | 323/271 |

* cited by examiner

*Primary Examiner* — Adolf Berhane
(74) *Attorney, Agent, or Firm* — Tung & Associates

(57) ABSTRACT

The present invention discloses a synchronous driver circuit, comprising: an inductor having one end coupled to an input voltage; a first power transistor having one end coupled to the other end of the inductor and another end supplying an output voltage; a second power transistor having one end coupled to the other end of the inductor and another end coupled to ground; a control circuit for controlling the operation of the first and second power transistors; a gate driver coupled to the control circuit and having an output controlling the gate of the first power transistor; and a bootstrap capacitor having one end coupled to a voltage node and the other end coupled to the other end of the inductor, the voltage across the bootstrap capacitor being provided as the operational voltage of the gate driver.

26 Claims, 5 Drawing Sheets

SYNCHRONOUS DRIVER CIRCUIT AND INTEGRATED CIRCUIT FOR USE THEREIN

BACKGROUND OF THE INVENTION

1. Field of Invention

The present invention relates to a synchronous driver circuit, and particularly it relates to a synchronous driver circuit with a bootstrap capacitor; for example, it can be used to drive light emitting diodes (LEDs). The present invention also relates to an integrated circuit for use therein.

2. Description of Related Art

Referring to FIG. 1, a power regulator 100 is often required for supplying power to a load circuit 200. In certain applications, the input voltage Vin and the output voltage Vout of the power regulator 100 do not always have a consistent relationship. For example, the same power regulator 100 may be employed in different applications which require different output voltages Vout for different load circuits 200. Under such circumstance, the input voltage Vin may be higher or lower than the output voltage Vout; hence, the power regulator 100 should be designed in such a way that it can meet both conditions. As another example, when the input voltage Vin is supplied by a battery, the input voltage Vin is higher than the output voltage Vout in the beginning; yet, as time passes, the battery voltage decreases, and the input voltage Vin gradually becomes lower than the output voltage Vout. In order to regulate the output voltage under the circumstance that the input voltage Vin and the output voltage Vout of the power regulator 100 do not have a consistent relationship, U.S. Pat. No. 6,788,033 discloses a synchronous buck-boost power regulator. As shown in FIG. 2, in this prior art, two sets of synchronous switches (i.e., four power transistors: Q11 and Q12, Q21 and Q22) are employed to perform buck conversion when the input voltage is higher than the output voltage, and boost conversion when the output voltage is higher than the input voltage.

In an application to drive LEDs, as shown in FIG. 3, U.S. Pat. No. 5,739,639 discloses an asynchronous structure wherein an inductor L, a transistor Q, and a diode D constitute an asynchronous boost power regulator. This prior art connects the LED circuit 200 between the output voltage Vout and the input voltage Vin, not between the output voltage Vout and ground. As such, the operational voltage (load voltage) of the LED circuit 200 becomes (Vout-Vin); this operational voltage can be higher or lower than the input voltage Vin. However, regardless whether the operational voltage is higher or lower than the input voltage Vin, proper power conversion can be achieved by a boost type power regulator.

The foregoing prior art circuits have respective drawbacks. U.S. Pat. No. 6,788,033 requires four power transistors and more complicated feedback control mechanism. U.S. Pat. No. 5,739,639 employs asynchronous structure, and it is well known that the power conversion efficiency of such structure is inferior.

In view of the aforementioned drawbacks, the present invention provides a synchronous driver circuit. In a synchronous driver circuit, facing a requirement that the input voltage and the load voltage do not have a consistent relationship, there may not be sufficient driving strength to drive the up-gate power transistor because the load circuit requires a higher voltage. The present invention provides a solution to this issue.

SUMMARY OF THE INVENTION

An objective of the present invention is to provide a synchronous driver circuit; as an example, it can be used to drive LEDs.

Another objective of the present invention is to provide an integrated circuit for use in the synchronous driver circuit.

To achieve the foregoing objective, in one perspective of the present invention, it provides a synchronous driver circuit, comprising: an inductor having one end coupled to an input voltage; a first power transistor having one end coupled to the other end of the inductor and another end supplying an output voltage; a second power transistor having one end coupled to the other end of the inductor and another end coupled to ground; a control circuit for controlling the operation of the first and second power transistors; a gate driver coupled to the control circuit and having an output controlling the gate of the first power transistor; and a bootstrap capacitor having one end coupled to a voltage node and the other end coupled to the other end of the inductor, the voltage across the bootstrap capacitor being provided as the operational voltage of the gate driver.

In another perspective of the present invention, it provides an integrated circuit for use in a synchronous driver circuit, the synchronous driver circuit converting an input voltage to an output voltage which is supplied to a load, the integrated circuit comprising: a first power transistor and a second power transistor coupled to a common node; a control circuit for controlling an operation of the first and second power transistors; a gate driver coupled to the control circuit, the gate driver having an output controlling a gate of the first power transistor; and a bootstrap capacitor having one end coupled to a voltage node and the other end coupled to the common node between the first and second power transistors, a voltage across the bootstrap capacitor being provided as an operational voltage of the gate driver.

In the foregoing synchronous driver circuit or the integrated circuit for use in the synchronous driver circuit, the voltage node can be always coupled to one of the input voltage and the output voltage, or can be switchable between two different voltages. In the latter condition, the synchronous driver circuit or the integrated circuit for use therein preferably further comprises a voltage level control circuit for controlling a level of the voltage node. In one preferable embodiment, the voltage level control circuit includes a switch device for switching the voltage node between two different voltages according to a switching signal. In another preferable embodiment, the voltage level control circuit includes a linear regulator (such as but not limited to a low drop-out regulator, LDO) supplying an output to the voltage node, the output being switchable between two different voltages.

The objectives, technical details, features, and effects of the present invention will be better understood with regard to the detailed description of the embodiments below, with reference to the drawings.

DESCRIPTION OF THE PREFERRED EMBODIMENTS

Figure 1:
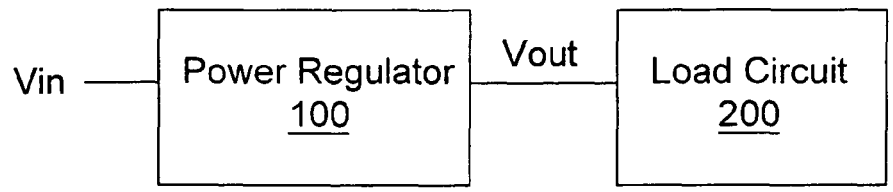
FIG. 1 illustrates that a power regulator converts an input voltage Vin to an output voltage Vout which is supplied to a load circuit.
Figure 2:
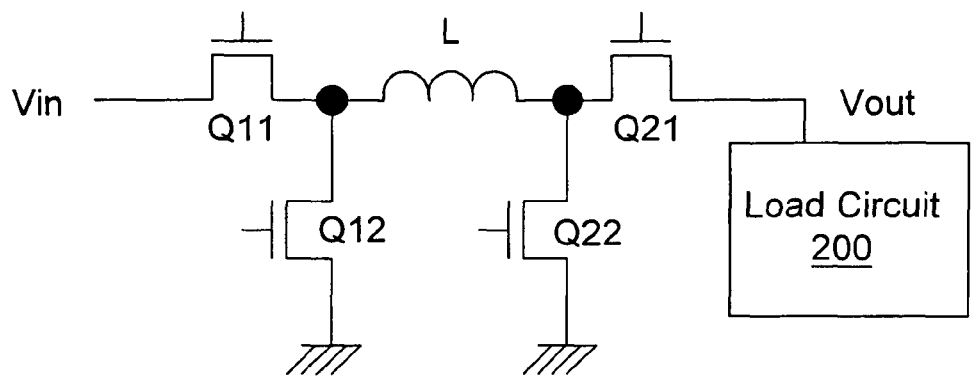
FIG. 2 shows a prior art buck-boost power regulator.
Figure 3:
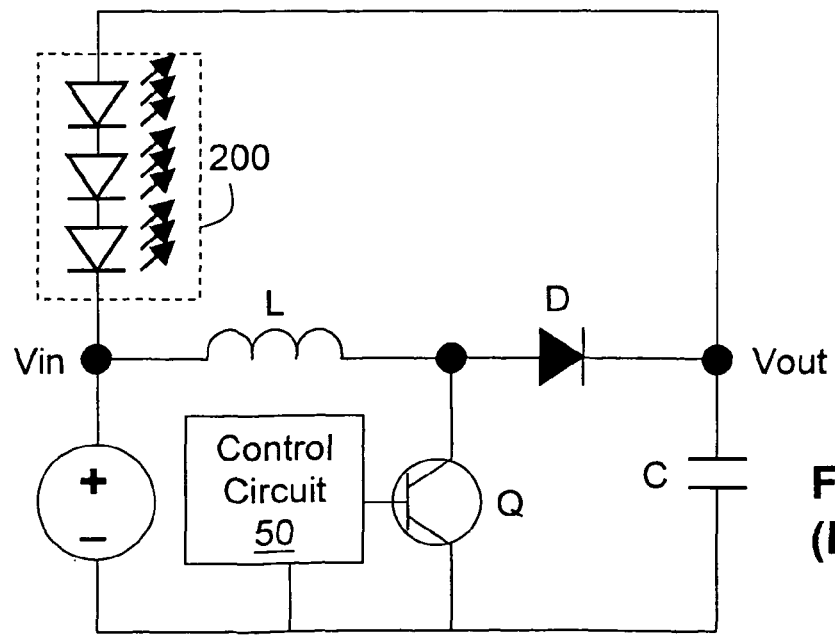
FIG. 3 shows another prior art circuit which is used to drive an LED circuit.
Figure 4:
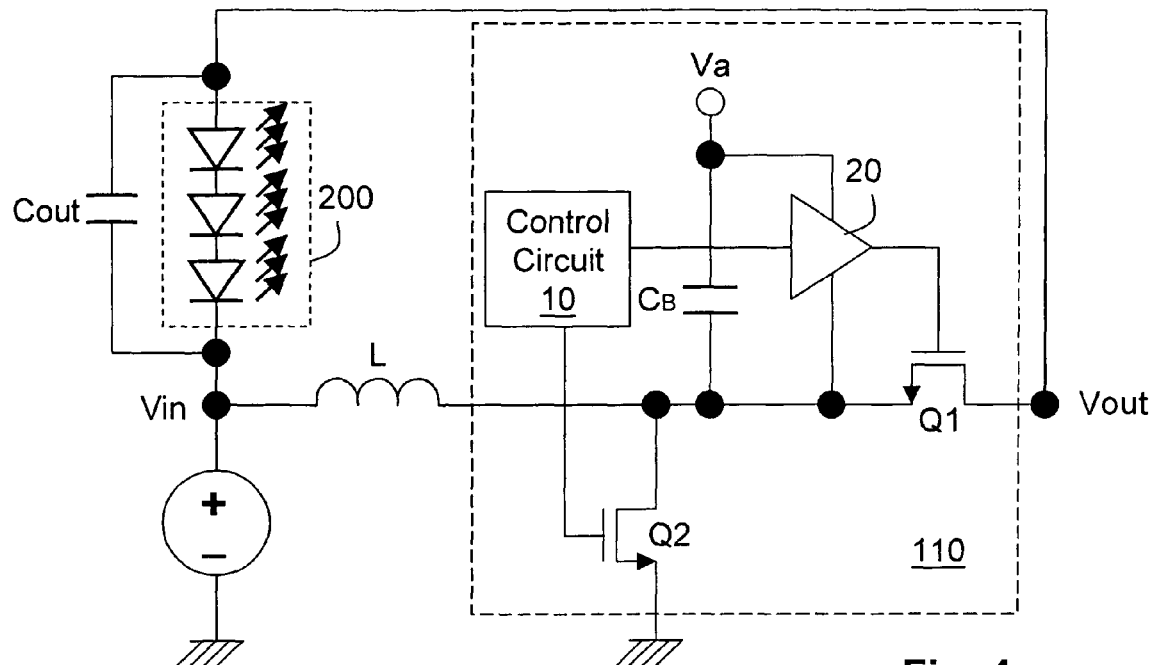
FIG. 4 shows a first embodiment of a synchronous driver circuit according to the present invention.

Please refer to FIG. 4, which shows a first embodiment of the present invention. An inductor L, a transistor Q1, a transistor Q2, and other circuit devices constitute a synchronous boost power regulator to supply power to a load circuit 200, wherein the load circuit 200 for example can be an LED circuit. The inductor L has one end coupled to an input voltage. The transistor Q1 has one end coupled to the other end of the inductor L and another end supplying an output voltage. The transistor Q2 has one end coupled to the other end of the inductor L and another end coupled to ground or the negative power rail. In one embodiment, some of the electronic devices such as the transistor Q1, the transistor Q2, a control circuit 10, a gate driver 20, a bootstrap capacitor CB and so on can be integrated into an integrated circuit chip 110. The load circuit (LED circuit) 200 has a lower side coupled to the input voltage Vin; hence, the operational voltage of the load circuit 200 (hereinafter referred to as the load voltage) is (Vout-Vin).

Apparently, under the circumstance illustrated above, when more LEDs are connected in the load circuit 200, the load voltage will increase. As mentioned earlier, in this case, there may not be sufficient driving strength to drive the up-gate power transistor Q1 when Vin is low. The present invention provides a solution to this problem. As shown in the drawing, the present invention provides a bootstrap capacitor CB connected between a voltage node Va and the right side of the inductor L. The voltage across the bootstrap capacitor CB is provided as an operational voltage for the gate driver 20, such that the gate voltage of the first power transistor Q1 has sufficient swing. Thus, even if more LEDs are connected in the load circuit 200, the entire circuit can still generate sufficient output voltage Vout and output current.

In the first embodiment, the voltage node Va can be coupled to the input voltage Vin, output voltage Vout, or any voltage nodes with sufficiently high voltage level, via a diode or a switch switching synchronously with and having the same phase as the power transistor Q2. For example, if the voltage node Va is connected to the input voltage Vin, when the low-gate power transistor Q2 is turned on, one end of the bootstrap capacitor CB is connected to the input voltage Vin and the other end thereof is connected to ground; hence, the voltage across the bootstrap capacitor CB is Vin. When the second power transistor Q2 is turned off and the first power transistor Q1 is turned on, the voltage across the bootstrap capacitor CB supplies a sufficient gate voltage to fully turn on the up-gate power transistor Q1.

Figure 5:
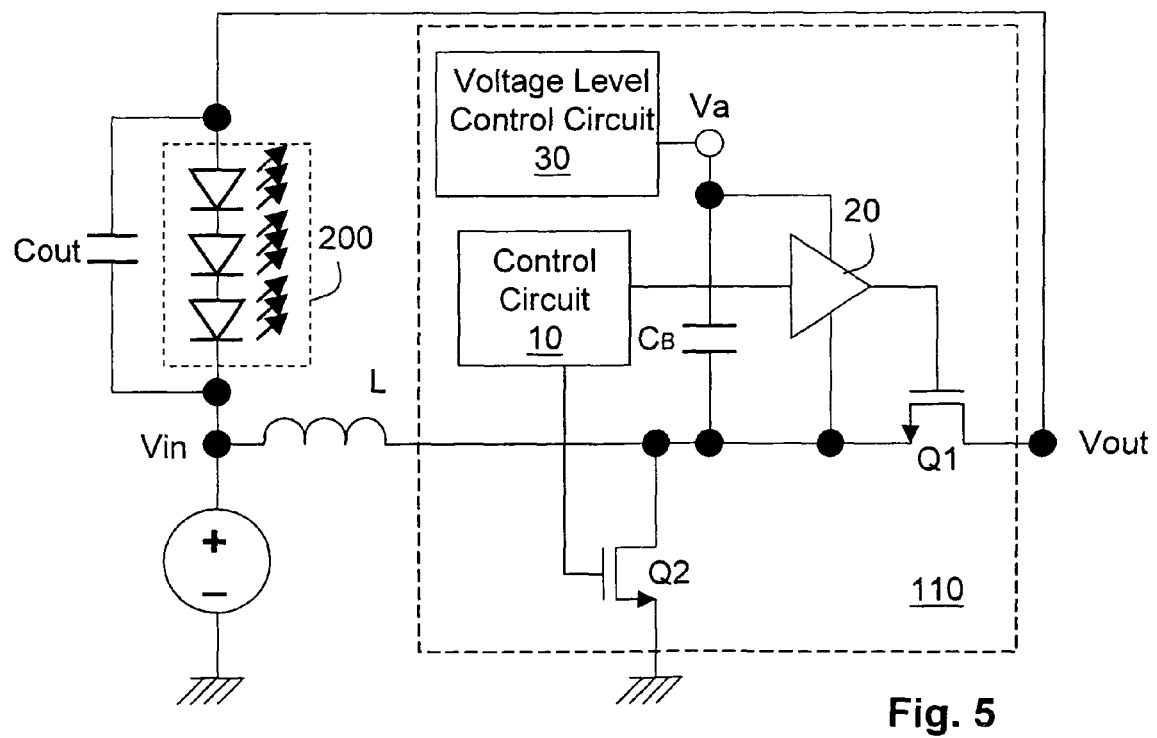
FIG. 5 shows a second embodiment of the synchronous driver circuit according to the present invention.

FIG. 5 shows a second embodiment of the present invention. This embodiment is different from the previous embodiment in that it further includes a voltage level control circuit 30 to supply a voltage Va, or to control the voltage level of the voltage node Va. The voltage level control circuit 30 is provided so that the voltage Va can be flexibly supplied by Vin, Vout, or any voltage nodes with sufficiently high voltage level. Thus, when the voltage Va is supplied by a less effective node, the circuit can automatically switch to a better node.

Figure 6:
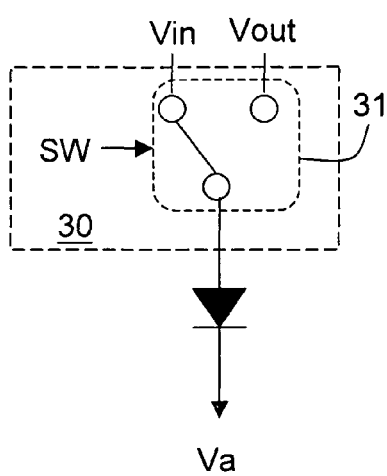
FIGS. 6 and 7 show two embodiments of a voltage level control circuit 30.
Figure 7:
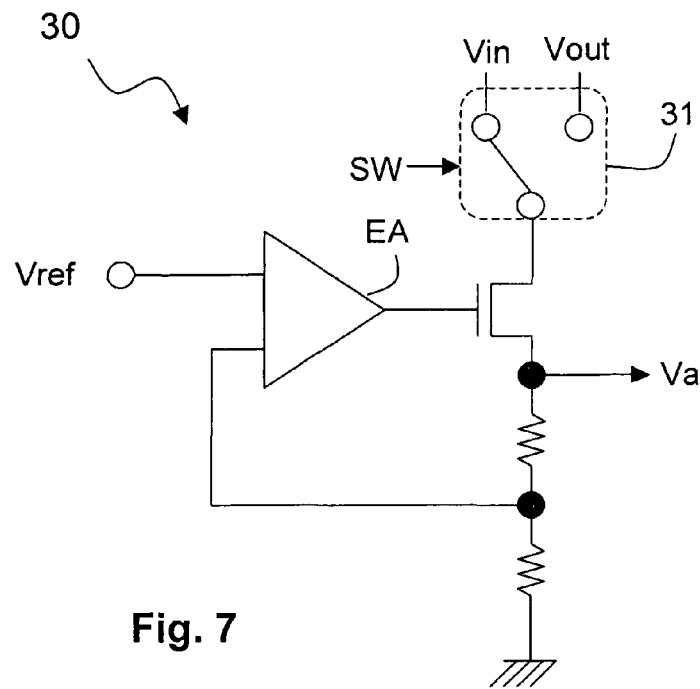

FIGS. 6 and 7 show two embodiments of the voltage level control circuit 30. In FIG. 6, a switch device 31 is provided which can flexibly switch the voltage node Va to Vin or Vout according to a switching signal SW. The voltage level control circuit 30 shown in FIG. 7 is a linear regulator (such as but not limited to a low drop-out regulator, LDO) with dual inputs, wherein the switch device 31 can flexibly switch the input voltage to Vin or Vout according to a switching signal SW.

Figure 8:
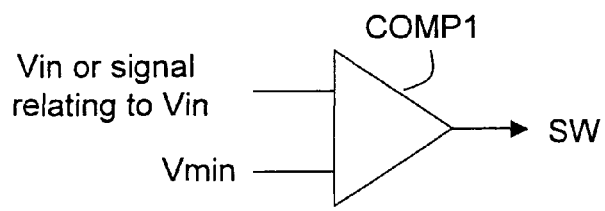
FIGS. 8 and 9 show two embodiments to generate a SW signal.
Figure 9:
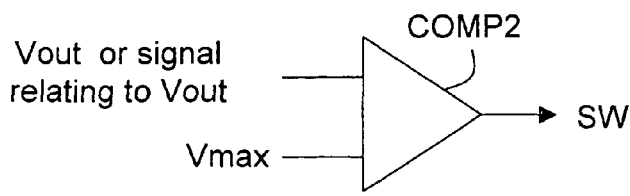

The switching signal SW can be generated for example by embodiments shown in FIGS. 8 and 9. In FIG. 8, the input voltage Vin (or a signal related to the input voltage Vin, such as its dividend voltage) is compared with a reference voltage Vmin by a comparator COMP1. When the input voltage Vin is lower than the reference voltage Vmin, it indicates that the voltage Va does not have sufficient driving strength, so the switching signal SW causes the voltage level control circuit 30 in FIGS. 6 and 7 to switch to Vout. In FIG. 9, the output voltage Vout (or a signal related to the output voltage Vout, such as its dividend voltage) is compared with a reference voltage Vmax by a comparator COMP2. When the output voltage Vout is higher than the reference voltage Vmax, it indicates that the voltage Va is too high, consuming too much power or may even damage the semiconductor devices, so the switching signal SW causes the voltage level control circuit 30 in FIGS. 6 and 7 to switch to Vin.

Figure 10:
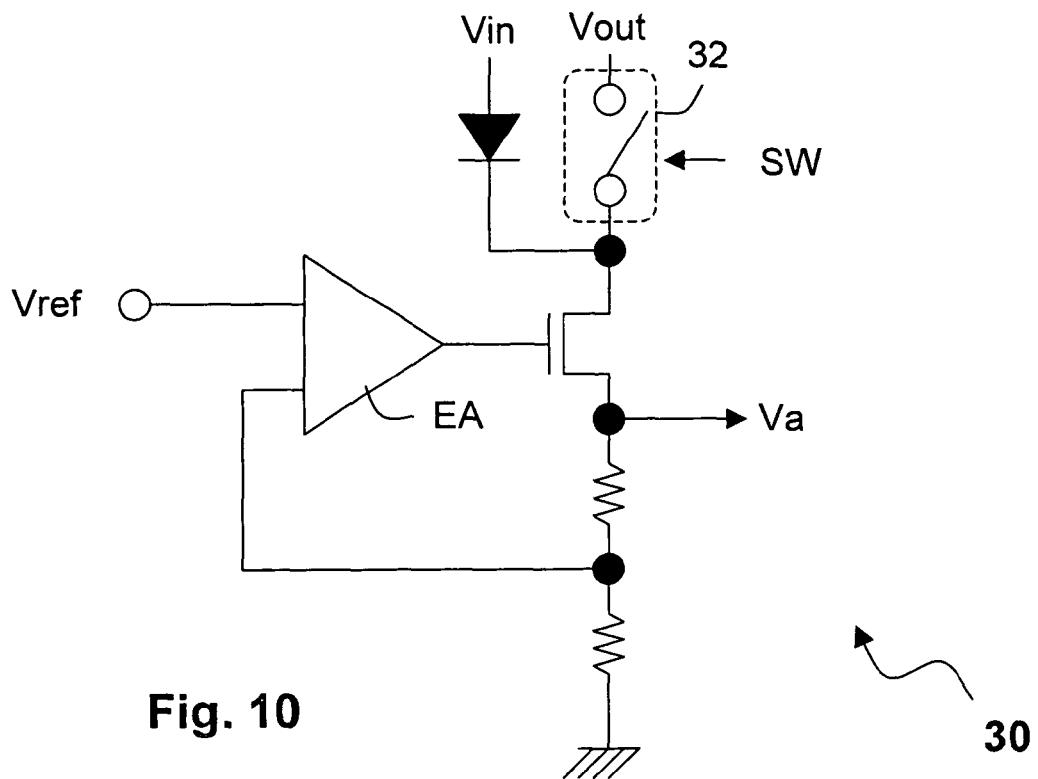
FIG. 10 shows another embodiment of the voltage level control circuit 30.
Figure 11:
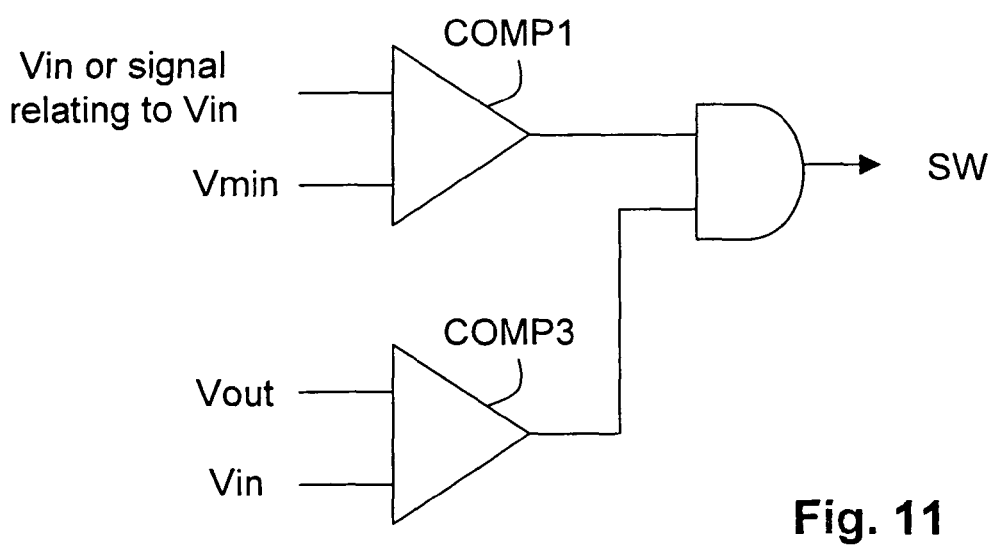
FIG. 11 shows another embodiment to generate the SW signal.
Figure 13:
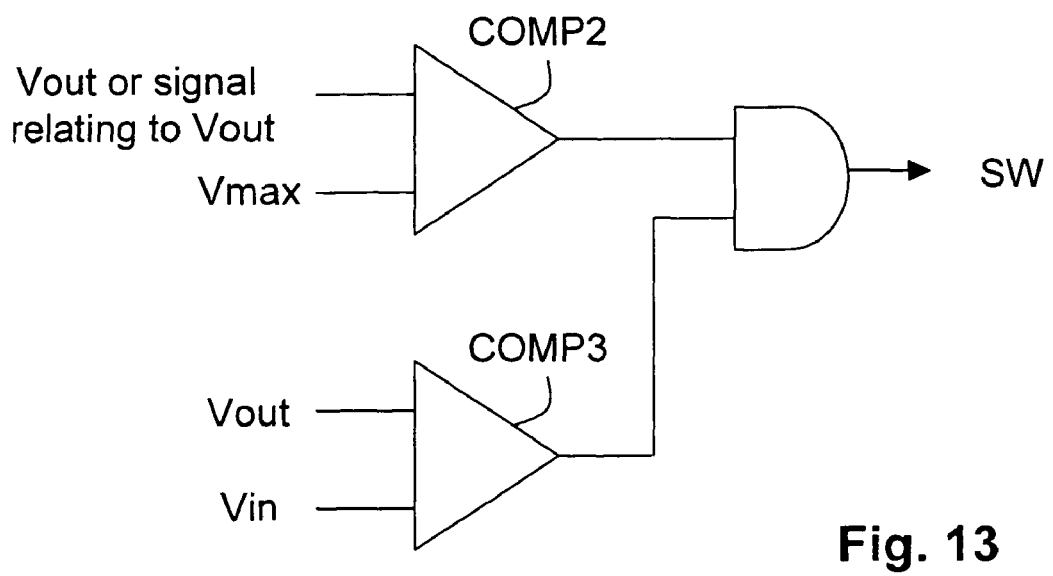
FIG. 13 shows yet another embodiment to generate the SW signal.

FIG. 10 shows another embodiment of the voltage level control circuit 30. In this embodiment, the input of the LDO is always connected with the input voltage Vin via a rectifier, and the switch device 32 is open in normal circumstance but can be closed by a switching signal SW to switch the input of the LDO to Vout. The switching signal SW of this embodiment can come from the circuit in FIG. 8 or 9 above, or a circuit in FIG. 11, where the switching signal makes the switch device 32 of the circuit in FIG. 10 to switch to Vout when the input voltage Vin is lower than the reference voltage Vmin and the output voltage Vout is higher than the input voltage Vin. The switching signal SW of this embodiment also can come from a circuit shown in FIG. 13 (will be discussed later).

Figure 12:
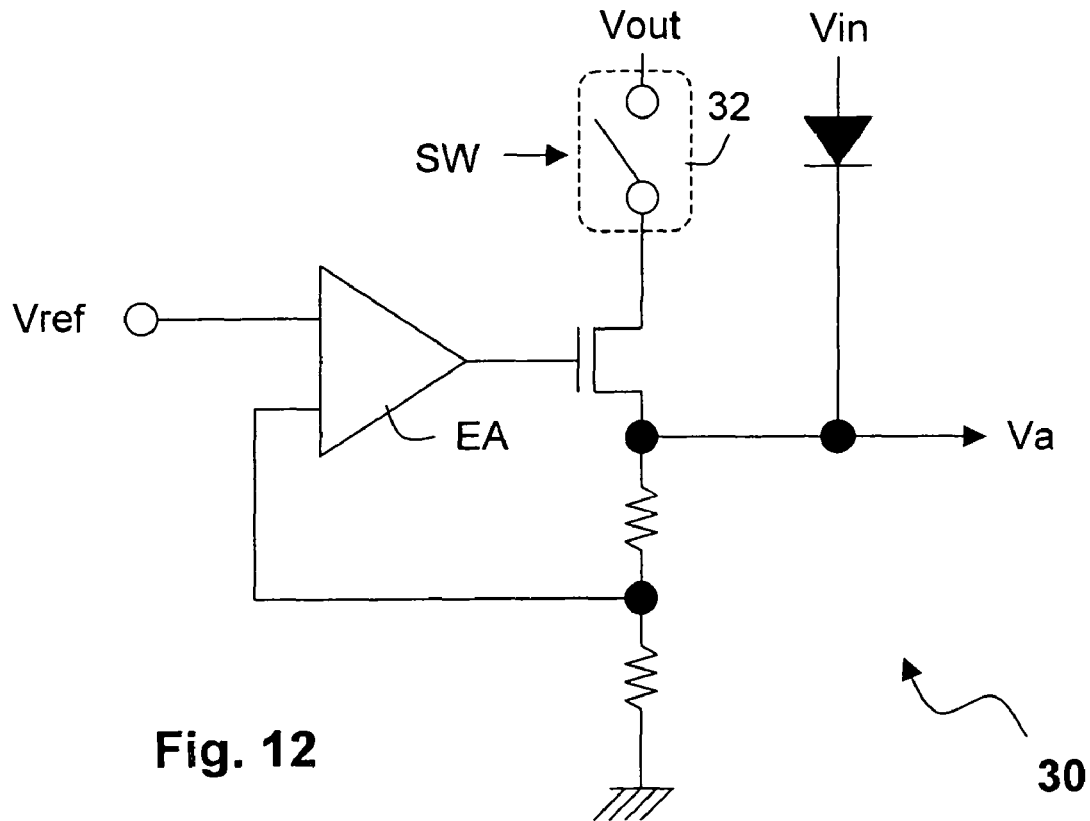
FIG. 12 shows yet another embodiment of the voltage level control circuit 30.

FIG. 12 shows another embodiment of the voltage level control circuit 30. In this embodiment, the voltage Va is always connected with the input voltage Vin via a rectifier and the LDO does not operate in normal circumstance, but the switch device 32 can switch the input of the LDO to Vout according to the switching signal SW. In the latter case, the LDO starts to operate and the voltage Va becomes the output voltage of the LDO which is supplied with the output voltage Vout. The switching signal SW can come from the circuit in FIG. 8, 9, or 11 mentioned above, or a circuit in FIG. 13, where the switching signal SW makes the switch device 32 of the circuit in FIG. 12 to switch to Vout when the output voltage Vout is lower than the reference voltage Vmax and the output voltage Vout is higher than the input voltage Vin.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. As one example, in FIG. 12, the connection-or-disconnection of the switch 32 can be replaced by the ON-or-OFF control of the linear regulator, or by simply adding a pull-down control at the gate (or base, if a BJT is used) of the output transistor of the linear regulator. And in FIGS. 6, 7, 10 and 12, the connection to Vin or Vout can be replaced by any voltage nodes with a sufficiently high voltage level (e.g., a voltage across the capacitor Cout), or a voltage related to Vin or Vout (e.g., Vin or Vout with certain voltage drop), or the like. As another example, the load circuit is not necessary an LED circuit, but can be any other types of circuits. As yet another example, although in the circuits shown in FIGS. 5 and 6, the lower side of the load circuit 200 is coupled to the input voltage Vin, the present invention can also be applied to an application wherein the lower side of the load circuit 200 is coupled to ground. In view of the foregoing, the spirit of the present invention should cover all such and other modifications and variations, which should be interpreted to fall within the scope of the following claims and their equivalents.

What is claimed is:

1. A synchronous driver circuit, comprising:
    an inductor having one end coupled to an input voltage;
    a first power transistor having one end coupled to the other end of the inductor and another end supplying an output voltage;
    a second power transistor having one end coupled to the other end of the inductor and another end coupled to ground or the negative power rail;
    a control circuit for controlling the operation of the first and second power transistors;
    a gate driver coupled to the control circuit and having an output controlling the gate of the first power transistor; and
    a bootstrap capacitor having one end coupled to a voltage node and the other end coupled to the other end of the inductor, wherein a voltage across the bootstrap capacitor supplies an operational voltage of the gate driver.

2. The synchronous driver circuit of claim 1, wherein the voltage node is coupled to the input voltage or the output voltage.

3. The synchronous driver circuit of claim 1, wherein the voltage node is switchable between two different voltages.

4. The synchronous driver circuit of claim 3, wherein the two different voltages are the input voltage and the output voltage respectively, or voltages related to the input voltage and output voltage respectively.

5. The synchronous driver circuit of claim 1, further comprising a voltage level control circuit for controlling a level of the voltage node.

6. The synchronous driver circuit of claim 5, wherein the voltage level control circuit includes: a switch device for switching the voltage node between two different voltages according to a switching signal.

7. The synchronous driver circuit of claim 6, wherein the switching signal is generated according to one of the following conditions: (1) when one of the two different voltages is lower than a first reference voltage; (2) when one of the two different voltages is higher than a second reference voltage; (3) when one of the two different voltages is lower than both the first reference voltage and the other one of the two different voltage; (4) when one of the two different voltages is lower than the second reference voltage and higher than the other one of the two different voltage.

8. The synchronous driver circuit of claim 5, wherein the voltage level control circuit includes: a linear regulator supplying an output to the voltage node, the voltage at the voltage node being switchable between two different voltages.

9. The synchronous driver circuit of claim 5, wherein the voltage level control circuit includes: a linear regulator supplying an output to the voltage node, the voltage node being switchable between the output of the linear regulator and a different voltage.

10. The synchronous driver circuit of claim 8, wherein the voltage level control circuit further includes a switch device for switching an input of the linear regulator between two different input voltages according to a switching signal.

11. The synchronous driver circuit of claim 10, wherein the switching signal is generated according to one of the following conditions: (1) when one of the two different voltages is lower than a first reference voltage; (2) when one of the two different voltages is higher than a second reference voltage; (3) when one of the two different voltages is lower than both the first reference voltage and the other one of the two different voltages; (4) when one of the two different voltages is lower than the second reference voltage and higher than the other one of the two different voltages.

12. The synchronous driver circuit of claim 8, wherein the voltage level control circuit further includes a switch device, and wherein the output of the linear regulator is coupled to a first voltage of the two different output voltages, and an input of the linear regulator is coupled to an input voltage through the switch device, the switch device switching the input of the linear regulator to the input voltage according to a switching signal.

13. The synchronous driver circuit of claim 3, wherein the output voltage is supplied to a load circuit, and the load circuit is coupled between the output voltage and the input voltage.

14. An integrated circuit for use in a synchronous driver circuit, the synchronous driver circuit converting an input voltage to an output voltage which is supplied to a load, the integrated circuit comprising:
    a first power transistor and a second power transistor coupled to a common node;
    a control circuit for controlling an operation of the first and second power transistors;
    a gate driver coupled to the control circuit, the gate driver having an output controlling a gate of the first power transistor; and
    a bootstrap capacitor having one end coupled to a voltage node and the other end coupled to the common node between the first and second power transistors, wherein a voltage across the bootstrap capacitor supplies an operational voltage of the gate driver.

15. The integrated circuit of claim 14, wherein the voltage node is coupled to the input voltage or the output voltage.

16. The integrated circuit of claim 14, wherein the voltage node is switchable between two different voltages.

17. The integrated circuit of claim 16, wherein the two different voltages are the input voltage and the output voltage respectively, or voltages related to the input voltage and the output voltage respectively.

18. The integrated circuit of claim 14, further comprising a voltage level control circuit for controlling a level of the voltage node.

19. The integrated circuit of claim 18, wherein the voltage level control circuit includes: a switch device for switching the voltage node between two different voltages according to a switching signal.

20. The integrated circuit of claim 19, wherein the switching signal is generated according to one of the following conditions: (1) when one of the two different voltages is lower than a first reference voltage; (2) when one of the two different voltages is higher than a second reference voltage; (3) when one of the two different voltages is lower than both the first reference voltage and the other one of the two different voltages; (4) when one of the two different voltages is lower than the second reference voltage and higher than the other one of the two different voltages.

21. The integrated circuit of claim 18, wherein the voltage level control circuit includes: a linear regulator having an output coupled to the voltage node, the voltage at the voltage node being switchable between two different voltages.

22. The synchronous driver circuit of claim 18, wherein the voltage level control circuit includes: a linear regulator supplying an output to the voltage node, the voltage node being switchable between the output of the linear regulator and a different voltage.

23. The integrated circuit of claim 22, wherein the voltage level control circuit further includes a switch device for switching an input of the linear regulator between two different input voltages according to a switching signal.

24. The integrated circuit of claim 23, wherein the switching signal is generated according to one of the following conditions: (1) when one of the two different voltages is lower than a first reference voltage; (2) when one of the two different voltages is higher than a second reference voltage; (3) when one of the two different voltages is lower than both the first reference voltage and the other one of the two different voltage; (4) when one of the two different voltages is lower than the second reference voltage and higher than the other one of the two different voltage.

25. The integrated circuit of claim 22, wherein the voltage level control circuit further includes a switch device, and wherein the output of the linear regulator is coupled to a first voltage of the two different output voltages, and an input of the linear regulator is coupled to an input voltage through the switch device, the switch device switches the input of the linear regulator to the input voltage according to a switching signal.

26. The integrated circuit of claim 16, wherein the load circuit is coupled between the output voltage and the input voltage.

* * * * *